United States Patent
Anderson et al.

(10) Patent No.: US 7,934,222 B2
(45) Date of Patent: Apr. 26, 2011

(54) ADAPTING COMMAND LINE INTERFACE MESSAGING IN A VIRTUAL OPERATING SYSTEM ENVIRONMENT

(75) Inventors: Ray W. Anderson, Liberty Hill, TX (US); Neal R. Marion, Georgetown, TX (US); Alexander Medvedev, Austin, TX (US); David Nevarez, Austin, TX (US); George F. Ramsay, III, Elgin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1327 days.

(21) Appl. No.: 11/422,447

(22) Filed: Jun. 6, 2006

(65) Prior Publication Data

US 2007/0283350 A1 Dec. 6, 2007

(51) Int. Cl.
*G06F 13/00* (2006.01)
(52) U.S. Cl. ..................................... 719/320
(58) Field of Classification Search .................. 719/320; 717/114, 115, 142, 143
See application file for complete search history.

(56) References Cited

U.S. PATENT DOCUMENTS

| | | | | |
|---|---|---|---|---|
| 6,148,323 A | * | 11/2000 | Whitner et al. | 718/105 |
| 6,715,141 B1 | * | 3/2004 | Hodge | 717/139 |
| 2005/0120160 A1 | | 6/2005 | Plouffe et al. | |

OTHER PUBLICATIONS

Carinhas, "Linux Fundamentals", Aug. 2, 2001, pp. 1-86.*
IBM Hypervisor and Virtual I/O Server, Feb. 11, 2006 <http://www-03.ibm.com/servers/eserver/openpower/virtualization/index.html>.

* cited by examiner

*Primary Examiner* — Andy Ho
*Assistant Examiner* — Phuong N Hoang
(74) *Attorney, Agent, or Firm* — Dillon & Yudell LLP

(57) ABSTRACT

A system, method and computer-readable medium for adapting command line output message streams in a virtualized command line interface (CLI) environment. In accordance with the method of the present invention, a virtualized CLI command is entered and executed. The virtualized CLI command encapsulates a guest operating system command having an associated standard output message. In response to executing the virtualized CLI command, the standard output message is piped to an output message file. Within the standard output message file, a structured array is used to search the standard output message for matches between strings within the standard output message and one or more specified message strings identified in the structured array. In response to finding a match between the specified message strings and the strings within the standard output message, the specified message string within the standard output message is replaced with a replacement message string.

20 Claims, 6 Drawing Sheets

ADAPTING COMMAND LINE INTERFACE MESSAGING IN A VIRTUAL OPERATING SYSTEM ENVIRONMENT

BACKGROUND OF THE INVENTION

1. Technical Field

The present invention relates generally to management of computer systems, and in particular to a method and system for facilitating command line interface virtualization in a shared data processing system. More particularly, the present invention relates to a method and system for dynamically adapting standard output messaging associated wilt guest operating systems in a virtualized command line interface environment.

2. Description of the Related Art

In a broad sense, virtualization refers to the abstraction of resources across many aspects of computing. Virtualization generally encompasses logically grouping data processing resources to provide improved accessibility to resources. A central aim of virtualization is that virtualized access to resources not be limited by the implementation or the physical configuration of the underlying computing resources. Commonly virtualized computing resources include processing resources and stored data.

Operating system-level virtualization is a server virtualization technology that entails defining and partitioning multiple logical or virtual servers within the operating system layer. Operating system-level virtualization enables multiple individual virtualized servers to function within logical partitions on a single physical server. Operating system-level virtualization utilizes so-called "guest" operating systems associated with corresponding designated logical partitions. Operating system-level virtualization architecture is low-overhead and facilitates maximally efficient use of server resources.

A virtual I/O server command line interface (VIOSCLI) is often utilized to provide an encapsulation layer to provide virtualization support among the several, often disparate, operating systems included in a logically partitioned server. The encapsulation provided by the VIOSCLI commands provides a standardized command input interface that can be utilized for each of the logical partitions regardless of the underlying operating system.

A significant problem arising with VIOSCLI implementations relates to error messaging. Error messaging, commonly referred to as standard error (stderr), is implemented by operating systems employing standard streams—standard in (stdin) and standard out (stdout)—that connect program processes to appropriate input and output data. In such operating systems, the standard streams logically couple the pipelined processes so that the output of each process (stdout) is applied as the input (stdin) of the next process. Standard error (stderr) is another standardized output stream typically used by programs to output error messages or diagnostics. The piping of stderr is typically independent of standard output. The typical stderr destination is the computer display associated with the systems that is executing the program, maximizing the likelihood of the error message being received by the user.

Exemplary operating systems having sets of chained or pipelined processes utilizing standard streams stdin, stdout, and stderr include IBM's Advanced Interactive eXecutive (AIX®) and Linux. Output message streams such as stderr or functional equivalents are utilized by most operating systems to provide an output channel between a command line process and the computing environment, particularly as it relates to output data provided to the user on a computer display output device.

Standard output streams such as stderr are designed and processed in association with the operating systems such as AIX® and Linux. A problem relating to the stderr streams arises in VIOSCLI environments due to the non-association between the higher level encapsulation layer VIOSCLI command structure and the stderr message structure. Specifically, entry and execution of a VIOSCLI command often results in execution of underlying guest operating system commands and calls. When the execution of the guest operating system results in an error or other program state or condition triggering an output message such as stderr, the text message displayed to the user relates to the otherwise hidden guest operating system command structure. This is undesirable due to possible invalidity of the displayed information. A more serious problem relates to possible system security breaches that may result if a stderr message displays security sensitive information such as privileged command names within the guest operating system.

From the foregoing, it can be appreciated that a need exists for a method, system, and computer program product that address the foregoing problems relating to virtualized I/O server command line interfaces. The present invention addresses these and other needs unresolved by the prior art.

SUMMARY OF THE INVENTION

A system, method and computer-readable medium for adapting command line output message streams in a virtualized command line interface (CLI) environment are disclosed herein. In accordance with the method of the present invention, a virtualized CLI command is entered and executed. The virtualized CLI command encapsulates a guest operating system command having an associated standard output message. In response to executing the virtualized CLI command, the standard output message is piped to an output message file. Within the standard output message file, a structured array is used to search the standard output message for matches between strings within the standard output message and one or more specified message strings identified in the structured array. In response to finding a match between the specified message strings and the strings within the standard output message, the specified message sting within the standard output message is replaced with a replacement message string.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
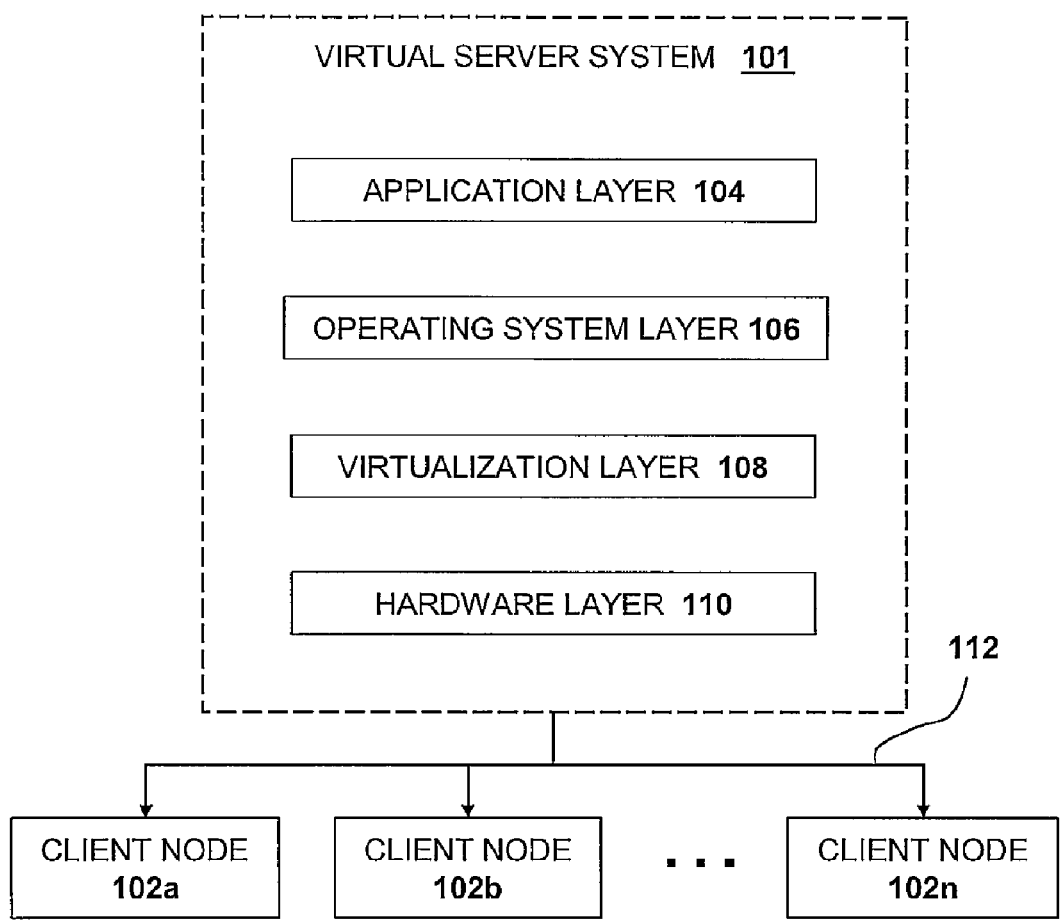
FIG. 1 is a high-level block diagram illustrating a virtual server architecture in which the present invention may be implemented.

The present invention is generally directed to facilitating command line interface virtualization in a shared resources data processing system, and more specifically, to a method and system for dynamically adapting standard output messaging associated with underlying guest operating systems in a virtualized command line interface environment.

In general, the devices that may comprise or relate to the present invention include a wide variety of data processing technology. Therefore, as background, a typical organization of hardware and software components within a virtualized data processing system is described prior to describing the present invention in more detail. With reference to the figures, wherein like reference numerals refer to like and corresponding parts throughout, and in particular with reference to FIG. 1, there is depicted an exemplary shared resources system 100 in which the present invention may be practiced. Shared resources system 100 generally comprises a virtual server system 101, which preferably includes one or more system layers providing layers of abstraction between processing entities. Virtual server system 101 includes a virtualization layer 108 that isolates higher level applications running on a guest operating system operating in layers 104 and 106, respectively, from an underlying hardware layer 110. Such applications may be, for example, any application program that may operate in a large scale shared application environment.

Virtual server system 101 may execute database server applications, web-based applications, file servers, or other applications that provide resources to multiple client nodes 102a-102n. High-level applications within application layer 104 may communicate directly with virtualization layer 108 (e.g., in the case of a database server application, wherein the application is part of the operating system) or may communicate indirectly through operating system layer 106. Virtualization layer 108 maps functions performed by one or more logically partitioned virtual processors to functions performed by one or more physical devices within hardware layer 110. Such physical devices may be, for example, physical data processing nodes having one or more processors.

Virtualization layer 108 fundamentally operates to emulate system images presented in the form of virtual servers (depicted in FIG. 4) to application layer 104 and operating system layer 106. In one embodiment, an instance of an operating system is executed by each virtual server presented by virtualization layer 108. The virtual servers act as individual systems, each executing a single instance of one of multiple guest operating systems with operating system layer 106.

Virtual server system 101 is communicatively coupled to client nodes 102a-102n via one or more communication networks 112. In this configuration, virtual server system 101 may function as a collective server entity within data processing system 100. It should be appreciated that data processing system 100 may include any number and type of computing systems, architecture, application, operating system or network, without departing from the spirit or scope of the invention.

Figure 2:
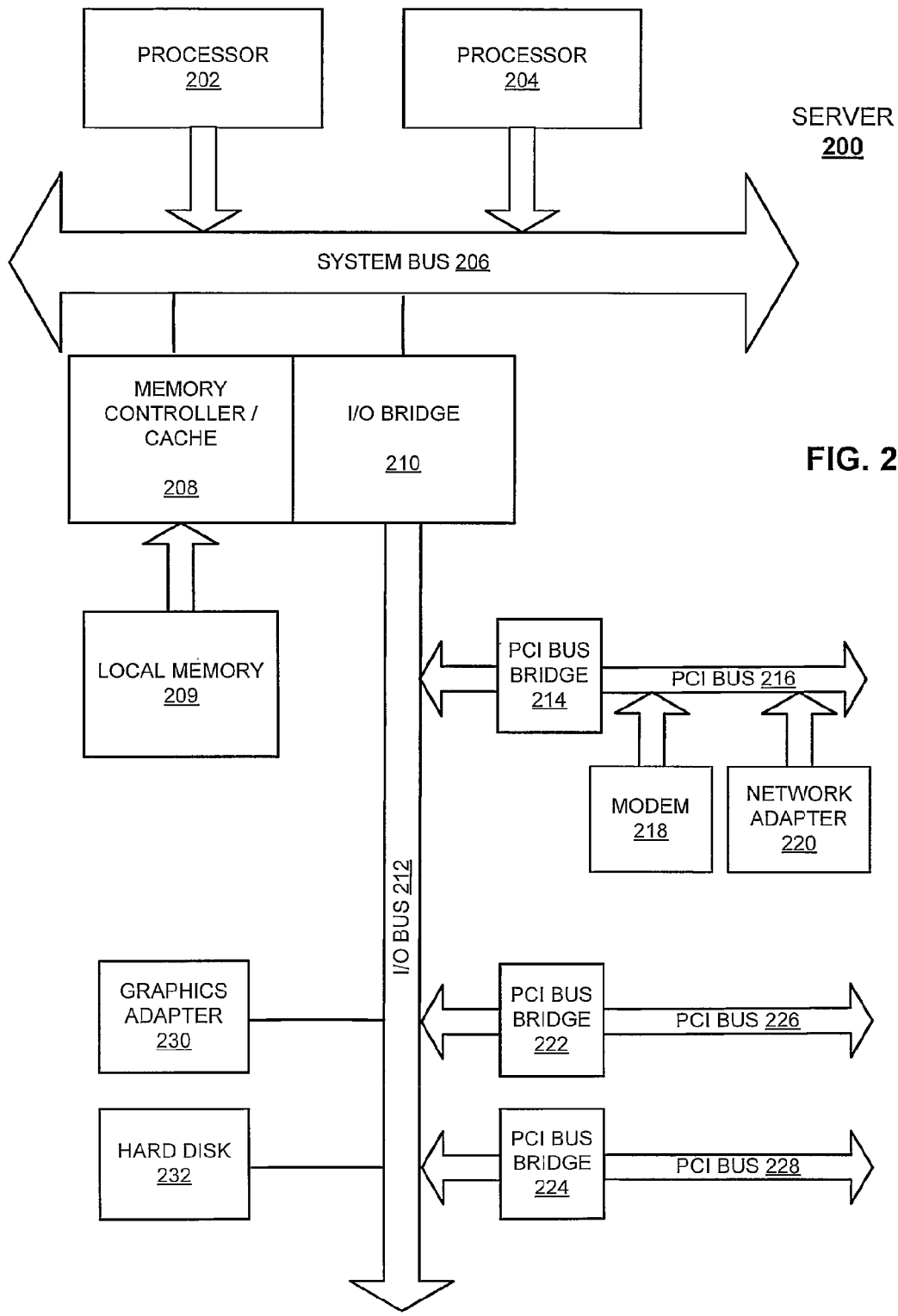
FIG. 2 is a block diagram depicting a data processing system that may be implemented as a server in accordance with a preferred embodiment of the present invention.

Referring to FIG. 2, there is illustrated a block diagram of a server data processing system 200 that may be implemented as a server, such as virtual server system 101 in FIG. 1, in accordance with a preferred embodiment of the present invention. Server system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to client nodes 102a-102n in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

Figure 3:
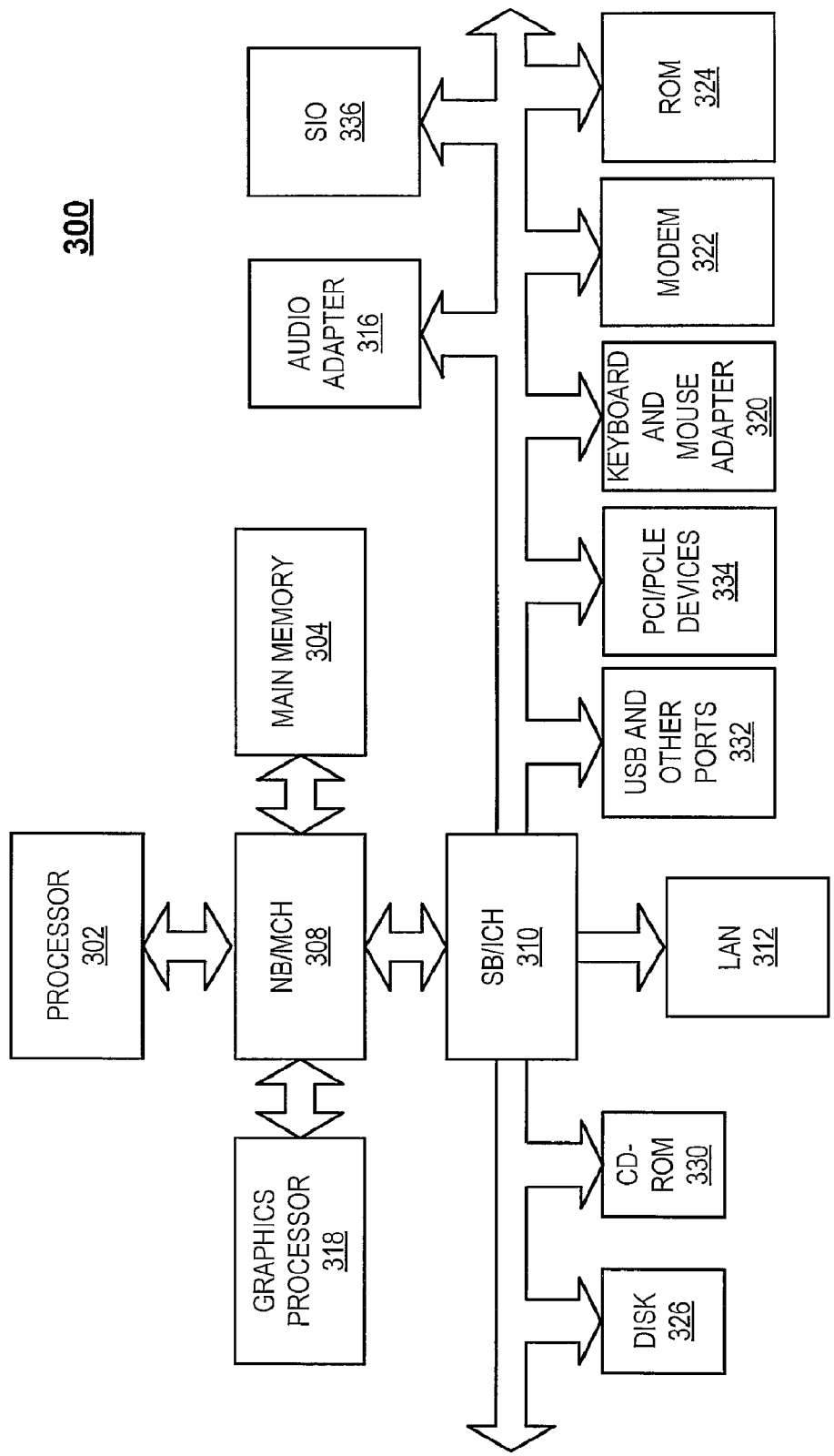
FIG. 3 is a block diagram illustrating a data processing system in which the present invention may be implemented.

With reference now to FIG. 3, a block diagram of a data processing system is shown in which the present invention may be implemented. Data processing system 300 is an example of a computer, such as virtual server system 101 and/or one or more of clients 102a-102n in FIG. 1, in which code or instructions implementing the processes of the present invention may be stored and executed. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, LAN adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash basic input/output system (BIOS). Hard disk drive 326 and CD- ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300. The operating system may be a commercially available operating system such as AIX®. An object oriented programming system, such as the Java® programming system, may run in conjunction with the operating system and provides calls to the operating system from Java® programs or applications executing on data processing system 300.

Instructions for the operating system, the object-oriented programming system, and applications or programs are located on storage devices, such as hard disk drive 326, and may be loaded into main memory 304 for execution by processor 302. The processes of the present invention may be performed by processor 302 using computer implemented instructions, which may be stored and loaded from a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system such as that described with reference to FIG. 2.

Data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Figure 4:
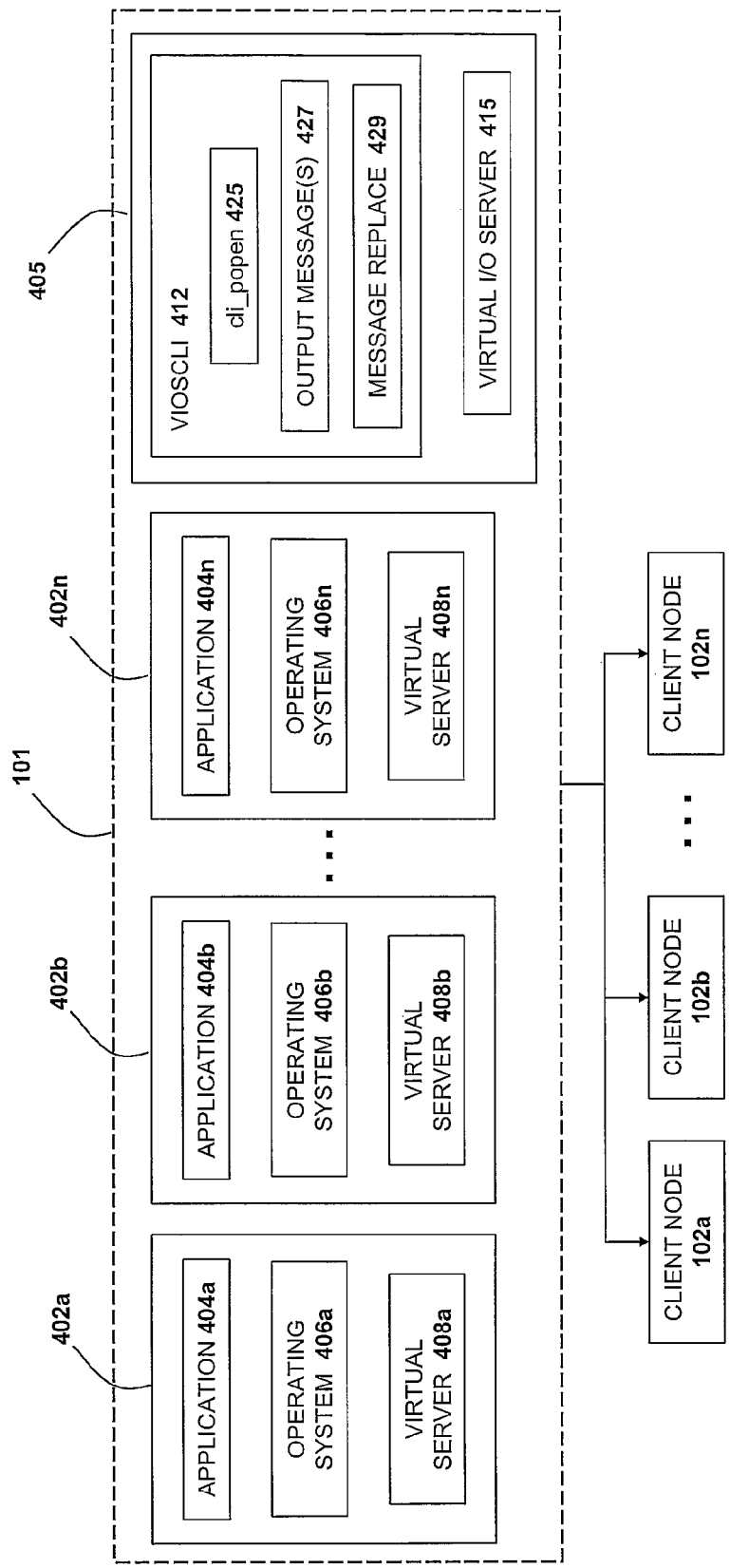
FIG. 4 is a block diagram depicting in greater detail an exemplary architecture for implementing a virtual I/O server command line interface in accordance with the present invention.

With reference to FIG. 4, there is illustrated a block diagram depicting in greater detail an exemplary architecture of shared resources system 100 adapted for implementing a virtual I/O server command line interface in accordance with the present invention. As shown in FIG. 4, virtual server system 101 includes an upper programming layer comprising multiple logical partitions 402a-402n each having one or more operating systems 406a-406n running on one or more virtual servers 408a-408n, respectively. According to one embodiment, virtual servers 408a-408n present single system interfaces to respective operating systems 406a-406n, regardless of the number of hardware processor nodes (not depicted) included in each virtual server. Each of virtual servers 408a-408n may be an instance of all architecture presented by a virtualization layer such as virtualization layer 108. Each of virtual servers 408a-408n may furthermore have a persistent identity and defined set of resource requirements (e.g., storage, memory, and network), resource access privileges, and/or resource limitations. In the depicted embodiment, partitions 402a-402n operate in a virtualized operating system environment in which each of operating systems 406a-406n is a guest operating system, such as, for example, AIX®, UNIX®, Linux, Windows®, or other operating systems executing in an encapsulated manner on the respective virtual servers 408a-408n.

In the depicted embodiment, the collection of software and hardware components comprising high-level applications 404a-404n, operating systems 406a-406n and virtual servers 408a-408n are partitioned into virtual partition 402a-402n. Software associated with each of virtual partitions 402a-402n runs on the logically partitioned hardware and presents a multi-processor system architecture to the upper layers, defining the virtual servers 408a-408n that hosting respective guest operating systems. While not expressly depicted in FIG. 4, components of virtual partitions 402a-402n may include a distributed virtual machine monitor program, interconnects, processors, memory, I/O devices and software and protocols used to bind them.

Virtual server system 101 further includes a virtual I/O server (VIOS) partition 405 that manages the configuration of system 101. VIOS partition 405 includes an associated virtual I/O server 415 that stores and processes information relating to the configuration of system 101. VIOS partition 405 preferably communicates with a management agent (not shown) executed by one or more virtual servers 408a-408n for the purpose of performing configuration changes, monitoring performance, and performing other administrative functions associated with system 101.

In addition to virtual I/O server 415, VIOS partition 405 includes a virtual I/O server CLI (VIOSCLI) 412 adapted for adapting command line output message streams in accordance with the present invention. As is well known in the art, a command line interpreter (CLI) or "shell" is generally a program that provides an interpreter and interfaces between the user and the operating system. More specifically, a CLI program executes commands that are entered into a command line user interface or from a file. The CLI or command processor (such as Windows®) is generally the highest level of the operating system software hierarchy and serves as a command interpreter. The CLI typically provides a system prompt, interprets commands entered by keyboard, mouse, or other user input media, and sends the interpreted command(s) to the appropriate lower levels of the operating system (e.g. the kernel) for processing.

VIOSCLI 412 includes program modules and instructions for receiving and processing commands received as command line input from a user input device or file. Specifically, VIOSCLI 412 provides a virtualization layer in which command line commands are mapped to underlying guest operating system commands. In this manner, the guest operating system commands are encapsulated such that the guest operating system semantics and syntax remains hidden from users entering the higher-level command set of VIOSCLI 412.

In accordance with the present invention, and as explained in further detail below with reference to FIGS. 5 and 6, VIOSCLI 412 includes a cli_popen function 425 that processes commands received by VIOSCLI 412. As part of command line execution within VIOSCLI 412, function 425 initiates the process called by the encapsulated guest operating system command and pipes one or more standard output messages such as those that may be contained in the stdout (standard output) and stderr (standard error) output streams. Conventionally, standard output messages, such as those contained in the stdout and stderr outputs, are natively piped (piped by default in accordance with the conventional guest operating system output piping) to an output display device such as a computer screen. In accordance with the present invention, cli_popen function 425 is adapted to pipe the one or more standard output messages to an output message file 427, which, as explained in further detail below, provides a string search forum in which erroneous or otherwise undesired message strings can be identified and replaced.

Figure 5:
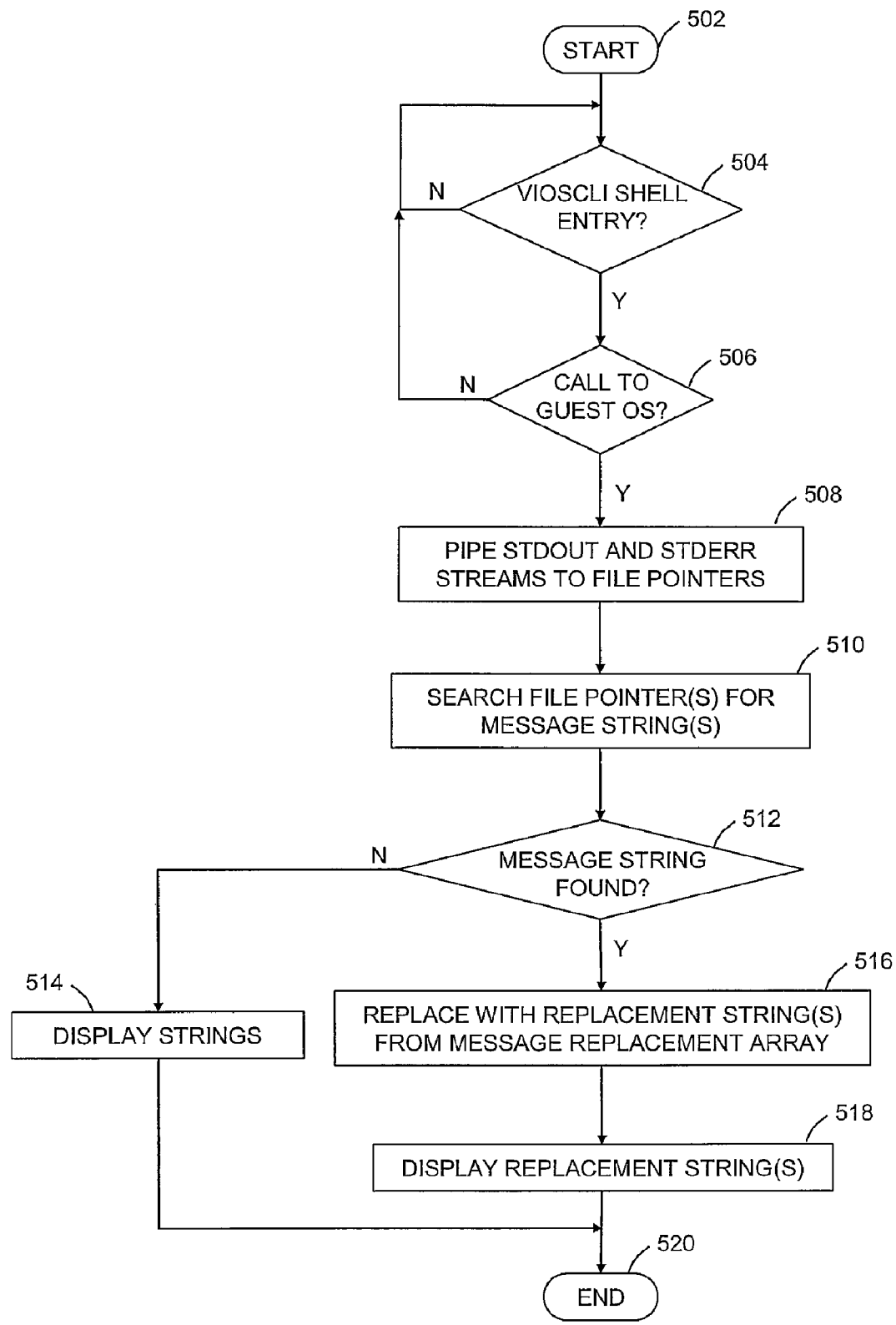
FIG. 5 is a high-level flow diagram depicting steps performed during command line processing in accordance with the present invention.

With reference now to FIG. 5, there is illustrated a high-level flow diagram depicting steps performed by a system such as VIOSCLI 412 during command line processing in accordance with the present invention. The process begins as illustrated at steps 502 and 504 with VIOSCLI 412 receiving and initiating execution processing of a virtualized CLI command entered by a keyboard, mouse, or other user data input device. If, as shown at steps 506 and 504, the VIOSCLI entry does not contain an encapsulated guest operating system command, the process continues with processing the next VIOSCLI entry. If, however, the received command line entry incorporates, in accordance with the OS virtualization implemented by VIOSCLI 412, an encapsulated guest operating system command, the cli_popen function 425 pipes the standard output messages, such as those contained in the stdout and stderr output streams associated with the encapsulated guest operating system command, to one or more output message file(s) 427 (steps 506 and 508). In a preferred embodiment, cli_popen function 425 pipes the stdout and stderr message streams to different file pointers within output message file(s) 427 such that the messages contained in each may be individually processed and subsequently combined as displayed output.

The present invention is directed, in part, to adapting the output message streams natively associated with underlying guest operating system commands to a virtualized command line interface environment such as virtual server system 101. In one aspect, the invention provides a mechanism by which erroneous or otherwise undesired messages associated with underlying guest operating system commands dynamically (i.e. on a per-command entry basis) searched and replaced if appropriate. To this end, execution processing of the entered command continues as shown at step 510 with a message replacement function 429 searching for a specified message string within the one or more standard output messages piped to output message file(s) 427. In accordance with the invention, a search and replace cycle is depicted beginning at step 512 in conjunction with FIG. 6.

Figure 6:
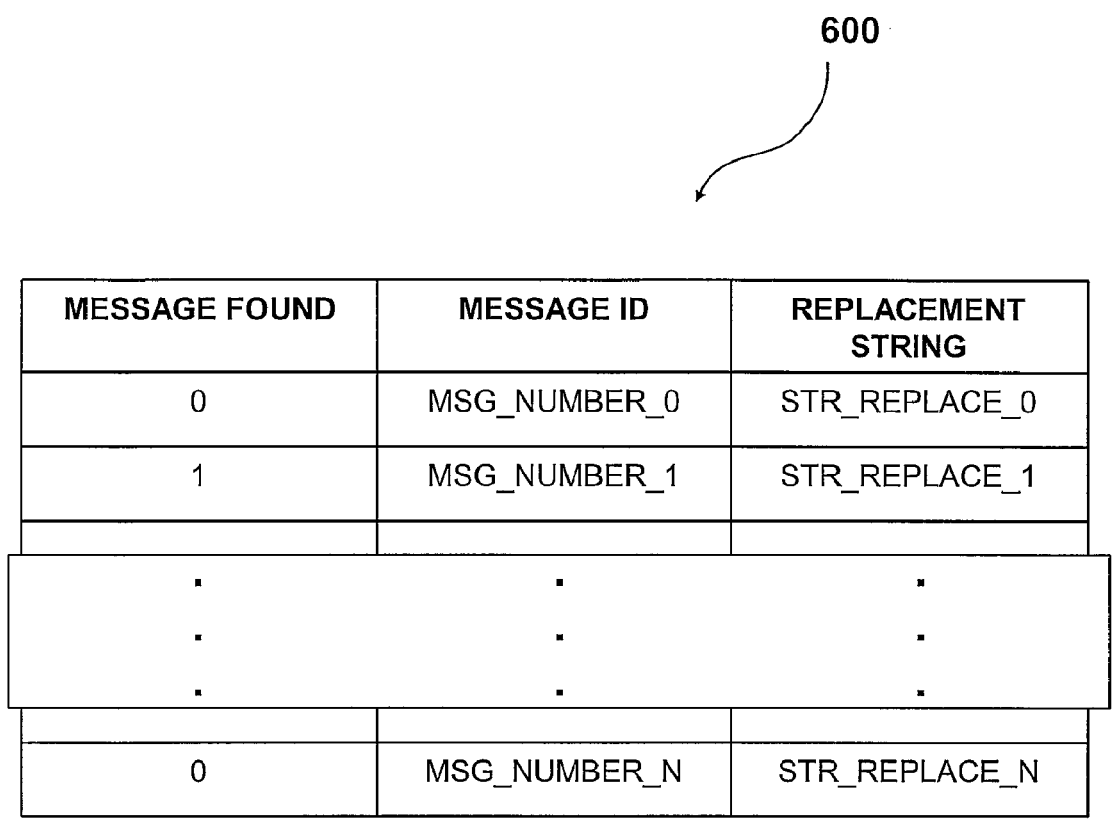
FIG. 6 illustrates a diagrammatic representation of a structured array that may be utilized for output message string search and replacement in accordance with the present invention.

FIG. 6 illustrates a diagrammatic representation of a structured array 600 that may be utilized by message replacement function 429 for output message string search and replacement in accordance with the present invention. As shown in FIG. 6, each of N+1 entries of structured array 600 generally comprises a Message Found value, a Message ID value, and a Replacement String value. The Message ID field contains the search string corresponding to a message to be removed and/or replaced. The Message ID field may contain the message string itself or may alternatively contain a key, such as a hash key pointer, or a simple message code, such as a message number corresponding to the message string to be searched for. The Message Found field indicates (by 1 or 0) whether or not the message indicated in the Message ID field has been found. The Replacement String field contains the replacement string or a pointer or key to the replacement string.

Proceeding as shown at steps 512 and 514, if a specified message string is not found in the piped messages, the message(s) piped by cli_popen 425 to output message file(s) 427 are directed to be displayed on a computer display. In the depicted embodiment using structured array 600, a "no match" determination results if a match cannot be found when comparing the message(s) piped to output message file(s) 427 and the N+1 entries in the Message ID field. If, however, the search results in a match being found between the standard output messages piped to output message file(s) 427 and one or more specified message strings, such as those included in the Message ID entries of structured array 600, the matched portions of standard output message(s) are replaced within output message file(s) 427 with the corresponding Replacement String entries (step 516). The modified output messages containing the replacement strings are then displayed on a computer display as shown at step 518 and the process ends at step 520. In the foregoing manner, the present invention provides a mechanism for efficiently and dynamically adapting CLI messaging in a virtualized operating system environment thereby enabling utilization of useful underlying guest operating system functionality in a multiple operating system environment.

The disclosed methods may be readily implemented in software using object or object-oriented software development environments that provide portable source code that can be used on a variety of computer or workstation hardware platforms. In this instance, the methods and systems of the invention can be implemented as a routine embedded on a personal computer such as a Java or CGI script, as a resource residing on a server or graphics workstation, as a routine embedded in a dedicated source code editor management system, or the like.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A method for adapting command line output messages in a virtualized command line interface (CLI) environment, the method comprising:

a virtual I/O server CLI (VIOSCLI), receiving a virtualized CLI command;

determining if the virtualized CLI command contains an encapsulated guest operating system command having an associated standard output message;

in response to determining the virtualized CLI command does not contain an encapsulated guest operating system command, processing a next VIOSCLI entry;

in response to determining the virtualized CLI command does contain an encapsulated guest operating system command:

executing the virtualized CLI command;

responsive to executing the virtualized CLI command, searching for a specified message string within the associated standard output message; and responsive to finding the specified message string, replacing the specified message string with a replacement message string from within a structured array.

2. The method of claim 1, wherein the standard output message is natively piped by the guest operating system to be displayed on a display device.

3. The method of claim 1, wherein the standard output message is included in a standard error message stream.

4. The method of claim 1, wherein the standard output message is included in a standard output message stream.

5. The method of claim 1, further comprising:

responsive to receiving the virtualized CLI command as a virtualized CLI entry, processing the encapsulated guest operating system command; and responsive to processing the encapsulated guest operating system command, displaying on a display device, a combined display output message corresponding to the replacement message string and a combination of one or more message streams.

6. The method of claim 1, wherein the searching is preceded by piping the associated standard output message to one or more output message files, the method further comprising, within the one or more output message files, searching for and replacing the specified message string with the replacement message string.

7. The method of claim 6, wherein the searching and replacing comprises searching the one or more output message files for one or more specified output message strings using search string criteria corresponding to one or more specified output message strings.

8. A system for adapting command line output messages in a virtualized command line interface (CLI) environment, the system comprising:
 a processor;
 an input/output (I/O) interface;
 a memory coupled to the processor, wherein the memory includes a processing logic executing on the processor to perform the functions of:
 receiving a virtualized CLI command at a virtual I/O server CLI (VIOSCLI);
 determining if the virtualized CLI command contains an encapsulated guest operating system command having an associated standard output message;
 in response to determining the virtualized CLI command does not contain an encapsulated guest operating system command, processing a next VIOSCLI entry;
 in response to determining the virtualized CLI command does contain an encapsulated guest operating system command:
  executing the virtualized CLI command;
  responsive to executing the virtualized CLI command, searching for a specified message string within the associated standard output message; and
  responsive to finding the specified message string, replacing the specified message string with a replacement message string from within a structured array.

9. The system of claim 8, wherein the standard output message is natively piped by the guest operating system to be displayed on a display device.

10. The system of claim 8, wherein the standard output message is included in a standard error message stream.

11. The system of claim 8, wherein the standard output message is included in a standard output message stream.

12. The system of claim 8, the processing logic further enabling the functions of:
 responsive to receiving the virtualized CLI command as a virtualized CLI entry, processing the encapsulated guest operating system command; and
 responsive to processing the encapsulated guest operating system command, displaying on a display device, a combined display output message corresponding to the replacement message string and a combination of one or more message streams.

13. The system of claim 8, further comprising: wherein the searching is preceded by piping the associated standard output message to one or more output message files, the processing logic further enabling the function of, within the one or more output message files, searching for and replacing the specified message string with the replacement message string.

14. The system of claim 13, wherein the searching and replacing comprises searching the one or more output message files for one or more specified output message strings using search string criteria corresponding to one or more specified output message strings.

15. A computer-readable storage medium having encoded thereon computer-executable instructions for adapting command line output messages in a virtualized command line interface (CLI) environment, said computer-executable instructions performing a method comprising:
 receiving a virtualized CLI command at a virtual I/O server CLI (VIOSCLI);
 determining if the virtualized CLI command contains an encapsulated guest operating system command having an associated standard output message, wherein the standard output message is natively piped by the guest operating system to be displayed on a display device;
 in response to determining the virtualized CLI command does not contain an encapsulated guest operating system command, processing a next VIOSCLI entry;
 in response to determining the virtualized CLI command does contain an encapsulated guest operating system command:
  executing the virtualized CLI command;
  responsive to executing the virtualized CLI command, searching for a specified message string within the associated standard output message; and
  responsive to finding the specified message string, replacing the specified message string with a replacement message string from within a structured array.

16. The computer-readable storage medium of claim 15, wherein the standard output message is included in a standard error message stream.

17. The computer-readable storage medium of claim 15, wherein the standard output message is included in a standard output message stream.

18. The computer-readable storage medium of claim 15, said method further comprising:
 responsive to receiving the virtualized CLI command as a virtualized CLI entry, processing the encapsulated guest operating system command; and
 responsive to processing the encapsulated guest operating system command, displaying on a display device, a combined display output message corresponding to the replacement message string and a combination of one or more message streams.

19. The computer-readable storage medium of claim 15, wherein the searching is preceded by piping the associated standard output message to one or more output message files, the method further comprising, within the one or more output message files, searching for and replacing the specified message string with the replacement message string.

20. The computer-readable storage medium of claim 19, wherein the searching and replacing comprises searching the one or more output message files for one or more specified output message strings using search string criteria corresponding to one or more specified output message strings.

* * * * *